United States Patent [19]

Langan et al.

[11] Patent Number: 5,301,335
[45] Date of Patent: Apr. 5, 1994

[54] REGISTER WITH SELECTIVE WAIT FEATURE

[75] Inventors: John A. Langan; Robert J. Amedeo, both of Austin; Nancy L. Thomas, Dripping Spring, all of Tex.

[73] Assignee: Motorola, Inc., Schaumburg, Ill.

[21] Appl. No.: 907,077

[22] Filed: Jul. 1, 1992

[51] Int. Cl.[5] .............................................. G06F 13/00
[52] U.S. Cl. .............................. 395/775; 364/DIG. 1; 364/271.5; 364/247.4
[58] Field of Search ................... 364/DIG. 1 MS File, 364/DIG.2 MS File; 395/550, 700, 775; 235/61 PD, 61 PM; 377/70

[56] References Cited

U.S. PATENT DOCUMENTS

| | | | |
|---|---|---|---|
| 4,809,162 | 2/1989 | Si | 364/DIG. 1 |
| 4,853,847 | 8/1989 | Ohuchi | 364/DIG. 1 |
| 5,068,881 | 11/1991 | Dervisoblu et al. | 377/70 |

Primary Examiner—Thomas M. Heckler
Attorney, Agent, or Firm—Jonathan P. Meyer

[57] ABSTRACT

A register having a selective wait feature includes logic for receiving a new value to be stored and logic for selectively delaying the appearance of the new value at the output of the register until some predetermined event has occurred. The register can also be read to determine whether the event has occurred. The register is disclosed in the context of a microprocessor-controlled digital timer apparatus which responds to an incoming pulse train. Certain control bits in the apparatus determine whether the digital timer is responsive to rising edges of the pulse train, falling edges, any edges, or no edges. The microprocessor determines, at the time new values are stored to those control bit locations, whether the new values are to become effective immediately or are to be delayed until some intervening event has occurred. The register permits control over the time at which transitions between different operating modes are made in order to assure orderly operation.

16 Claims, 10 Drawing Sheets

|  | BIT 7 | BIT 6 | BIT 5 | BIT 4 | BIT 3 | BIT 2 | BIT 1 | BIT 0 | |
|---|---|---|---|---|---|---|---|---|---|
| $X050 | | | | | | | | | ICCNT(hi) |
| $X051 | | | | | | | | | ICCNT(lo) |
| $X052 | | | | | | | | | DCCNT(hi) |
| $X053 | | | | | | | | | DCCNT(lo) |
| $X054 | | | | | | | | | ICC1(hi) |
| $X055 | | | | | | | | | ICC1(lo) |
| $X056 | | | | | | | | | ICC2(hi) |
| $X057 | | | | | | | | | ICC2(lo) |
| $X058 | | | | | | | | | ICC3(hi) |
| $X059 | | | | | | | | | ICC3(lo) |
| $X05A | | | | | | | | | ICC4(hi) |
| $X05B | | | | | | | | | ICC4(lo) |
| $X05C | | | | | | | | | PACC1 |
| $X05D | | | | | | | | | PACC2 |
| $X05E | | | | | | | | | PACC3 |
| $X05F | | | | | | | | | PACC4 |
| $X060 | DCZF | ICOVF | – | – | ICC4F | ICC3F | ICC2F | ICC1F | ICFLG |
| $X061 | DCZI | ICOVI | – | – | ICC4I | ICC3I | ICC2I | ICC1I | ICMSK |
| $X062 | WFLT1 | CRD1H | CED1B | CED1A | – | PRD1H | PED1B | PED1A | ICTCR1 |
| $X063 | WFLT2 | CRD2H | CED2B | CED2A | – | PRD2H | PED2B | PED2A | ICTCR2 |
| $X064 | WFLT3 | CRD3H | CED3B | CED3A | – | PRD3H | PED3B | PED3A | ICTCR3 |
| $X065 | WFLT4 | CRD4H | CED4B | CED4A | – | PRD4H | PED4B | PED4A | ICTCR4 |
| $X066 | MODDC | RDDCL | DCPR1 | DCPR0 | ICLAT | DCLAT | ICPR1 | ICPR0 | ICPRE |

*FIG. 10*

REGISTER WITH SELECTIVE WAIT FEATURE

FIELD OF THE INVENTION

The present invention relates, in general, to a register with a selective wait feature. More particularly, the invention relates to a register which is adapted for use in a microprocessor or similar environment and which permits values written into the register to be selectively delayed from appearing at the outputs of the register until some later event occurs.

BACKGROUND OF THE INVENTION

Registers are one common form of storage used in digital computing systems such as microprocessors. In many such systems, especially in systems intended for control-oriented applications, certain registers control the functionality of certain subsystems. A very simple example is a microprocessor which includes a subsystem for counting the number of pulses of an input signal, commonly referred to as a pulse accumulator subsystem. A control register for the pulse accumulator subsystem might contain an enable bit at a particular location. Such an enable bit would, under software control, determine whether the pulse accumulator is enabled to count pulses or is disabled. Many control bits act not to enable or disable a subsystem, but to select among one or more alternate modes of operation. For instance, another control bit in the pulse accumulator control register described above might determine whether the pulse accumulator counts each pulse of the incoming signal or counts only every other pulse.

Particularly in the case of control bits which select among various modes of operation, some care must be taken in using the system to assure that changes in the setting of the control bits occur at an appropriate time. Typically, the burden of assuring a proper transition between modes of operation is placed on the designer of the software which will control the operation of the system. However, as the number of semi-autonomous subsystems which can be integrated into a single integrated circuit microprocessor increases, each of which may have mode control bits in registers, this burden on the software can become too great. In addition, it is possible that insufficient time may exist in some application to permit software to recognize and react to the requirement for a mode change.

SUMMARY OF THE INVENTION

These and other requirements are provided by the present invention. In one embodiment, the present invention provides a data processing system including: a central processing unit for executing instructions; a register under control of the central processing unit for storing a data value and for providing an output signal; wait control logic under control of the central processing unit for determining, at a time at which the central processing unit causes the register to store a particular data value, whether the output signal provided by the register shall immediately represent the particular data value or shall represent the particular data value only at a later time.

BRIEF DESCRIPTION OF THE DRAWINGS

FIG. 10 illustrates, in tabular form, a partial memory map of the microcontroller of FIG. 9.

DETAILED DESCRIPTION OF THE INVENTION

The terms "assert", "assertion", "negate" and "negation" will be used to avoid confusion when dealing with a mixture of "active high" and "active low" signals. "Assert" and "assertion" are used to indicate that a signal is rendered active, or logically true. "Negate" and "negation" are used to indicate that a signal is rendered inactive, or logically false. In addition, the terms "set" and "clear" will be used when referring to the rendering of a status bit or similar apparatus into its logically true or logically false state, respectively.

Figure 1:
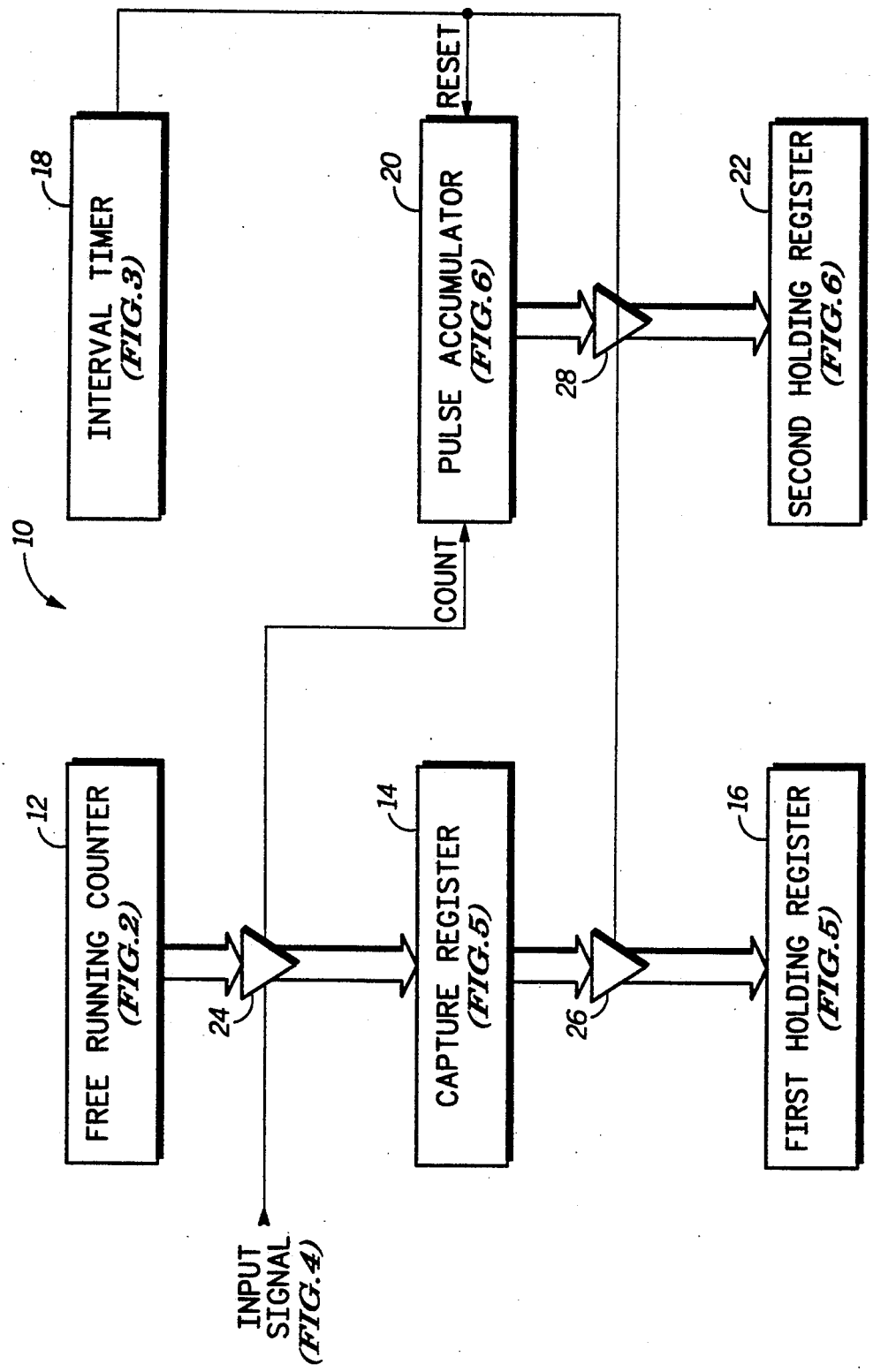
FIG. 1 illustrates, in block diagram form, a digital timer apparatus.

FIG. 1 illustrates, in block diagram form, a digital timer apparatus 10 embodying the present invention. In general, digital timer apparatus 10 comprises a free running counter 12, a capture register 14, a first holding register 16, an interval timer 18, a pulse accumulator 20 and a second holding register 22. Digital timer apparatus 10 further comprises first selective coupling logic 24, second selective coupling logic 26 and third selective coupling logic 28.

Figure 2:
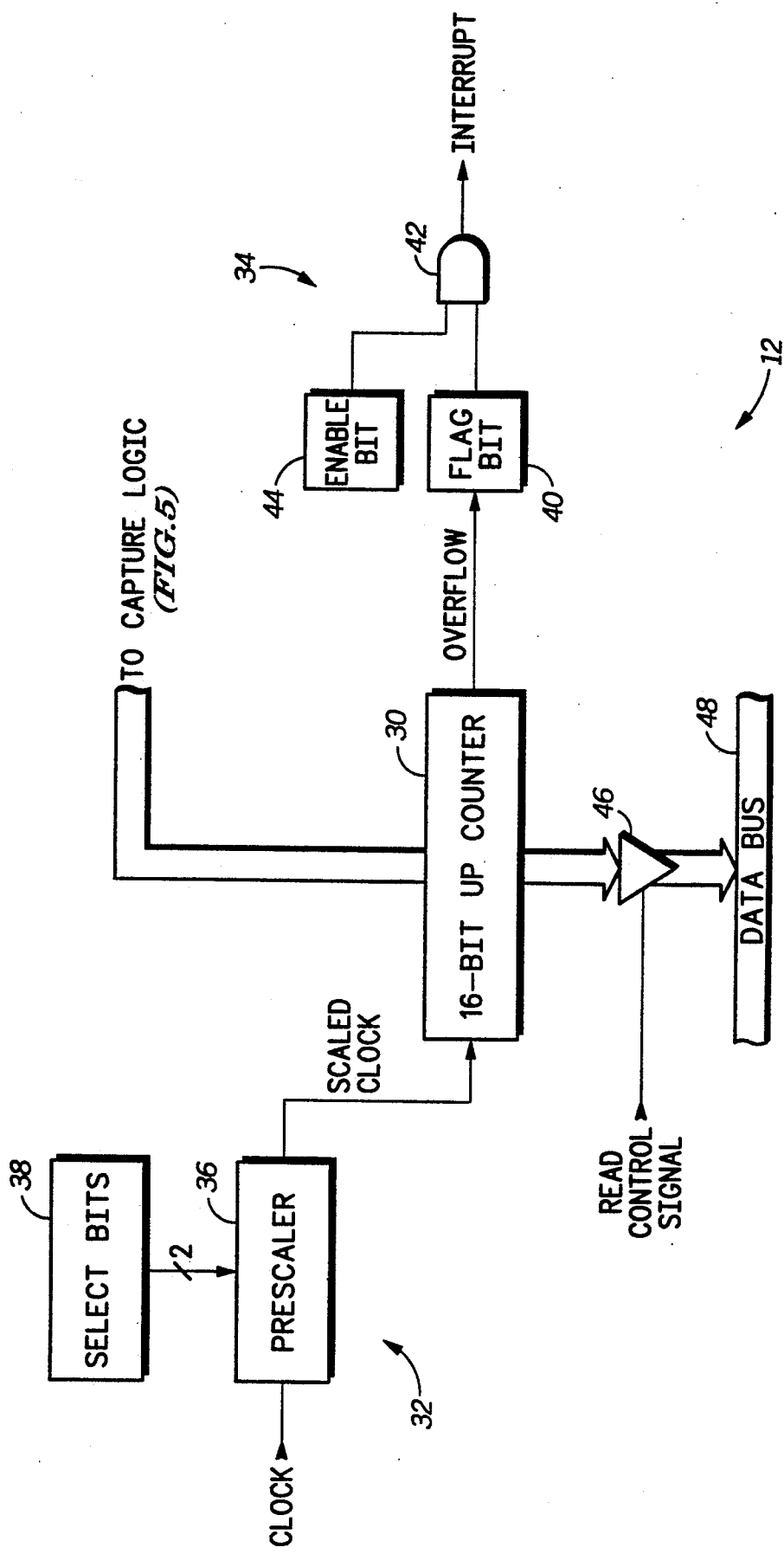
FIG. 2 illustrates, partially in block diagram form and partially in logic diagram form, the free running counter of FIG. 1.

Free running counter 12, which is more completely described below with reference to FIG. 2, is a multi-bit up- or down-counter which receives a constant frequency clock signal and provides a multi-bit output signal which changes at the frequency of the clock signal. A free running counter, as is familiar in the art, provides a digital representation of "real time", much as a clock face provides an analog representation of "real time". The multi-bit output of free running counter 12 is connected to an input of first selective coupling logic 24. A control input of first selective coupling logic 24 is coupled to receive an input signal. The apparatus which generates the input signal is more completely described below with reference to FIG. 4. First selective coupling logic 24 couples the multi-bit signal present at its input to its output when the signal coupled to the control input is active. The output of first selective coupling logic 24 is connected to an input of capture register 14. Accordingly, an active input signal causes the current value of the output of free running counter 12 to be captured, or stored, in capture register 14.

First selective coupling logic 24 is illustrated using a symbol which, as commonly used, implies the presence of some active signal driving capability. As will be apparent to one of skill in the art, such active signal driving capability may not be necessary. If the signal driving capability of free running counter 12 is adequate to drive the load represented by capture register 14 and the intervening signal lines, then first selective coupling logic 24 may be no more than a transmission gate. In other circumstances, some signal driving capability will be required.

The input signal, in addition to being coupled to first selective coupling logic 24, is also coupled to a count input of pulse accumulator 20. As is familiar in the art, a pulse accumulator is a multi-bit up- or down-counter which receives a randomly occurring count signal. Each active transition of the count signal causes the multi-bit value in the pulse accumulator to be incremented or decremented by one. Pulse accumulator also receives a reset control signal input which, when active, causes the contents of the pulse accumulator be reset to a known state, commonly all zeroes. Thus, the contents of pulse accumulator 20 represent the number of active transitions of the input signal which have occurred since the last time the reset signal was active. Although not illustrated here, pulse accumulator 20 may also be preset to a particular value by a user of digital timer apparatus 10.

Figure 3:
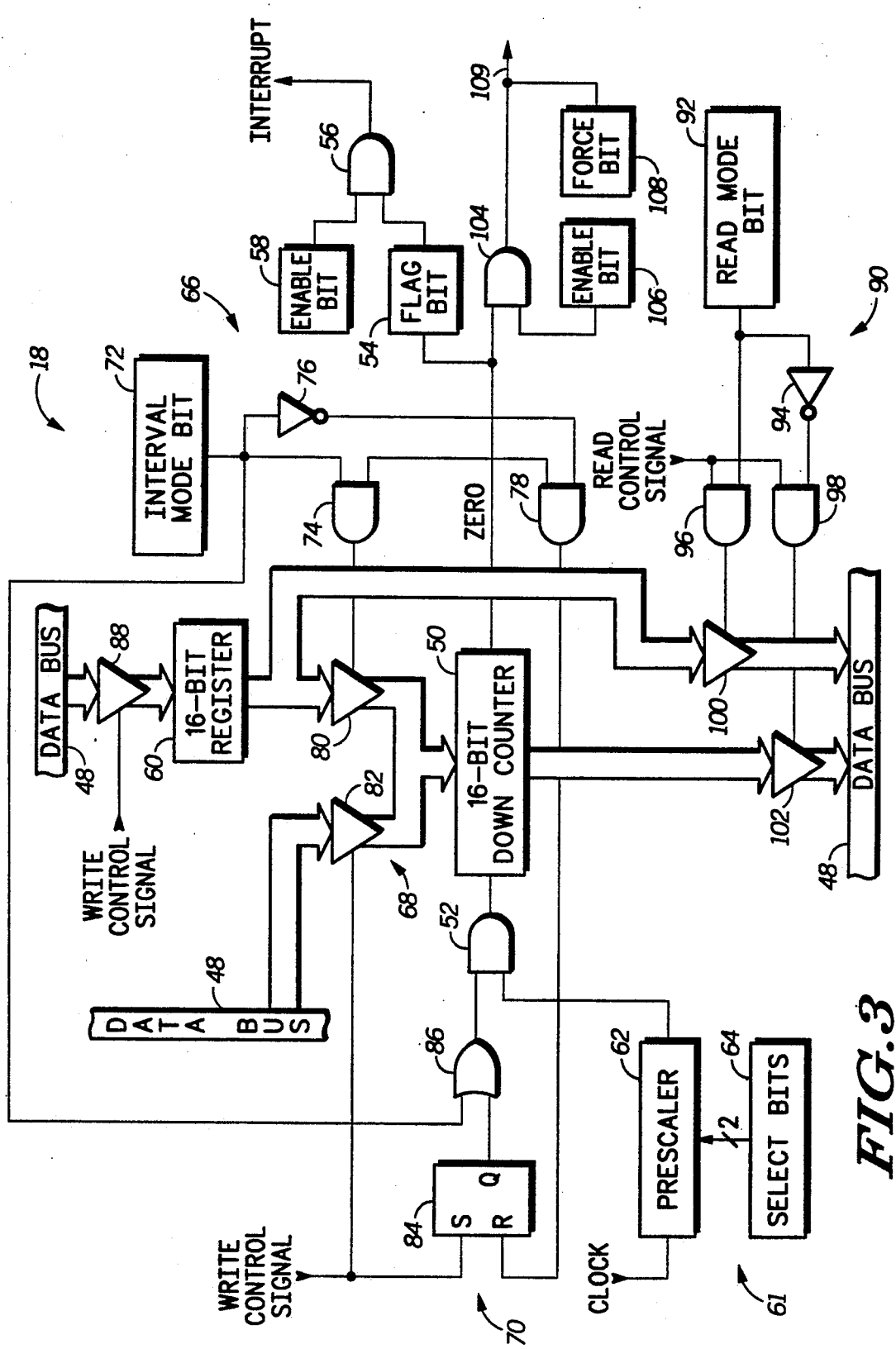
FIG. 3 illustrates, partially in block diagram form and partially in logic diagram form, the interval timer of FIG. 1.

Interval timer 18, which is described more completely below with reference to FIG. 3, is an apparatus which provides an active output signal at known, and perhaps programmable, intervals of time. The output signal provided by interval timer 18 is connected to the reset input of pulse accumulator 20. Accordingly, pulse accumulator 20 is reset to a known state each time the output of interval timer 18 becomes active.

As is described more fully below with reference to FIG. 5, a multi-bit digital output of capture register 14 is connected to an input of second selective coupling logic 26. The output of second selective coupling logic 26 is connected to an input of first holding register 16. The control input of second selective coupling logic 26 is connected to the output of interval timer 18. Accordingly, the then-current value of the contents of capture register 14 is stored in first holding register 16 each time the output of interval timer 18 becomes active.

As is described more fully below with reference to FIG. 6, a multi-bit digital output of pulse accumulator 20 is connected to an input of third selective coupling logic 28. The output of third selective coupling logic 28 is connected to an input of second holding register 22. The control input of third selective coupling logic 28 is connected to the output of interval timer 18. Accordingly, the then-current value of the contents of pulse accumulator 20 is stored in second holding register 22 each time the output of interval timer 18 becomes active. Of course, some precaution must be taken in the design of pulse accumulator 20 and third selective coupling logic 28 to ensure that the value of the contents of pulse accumulator 20 are stored in second holding register 22 before the active output of interval timer 18 causes pulse accumulator 20 to be reset.

The digital timer apparatus 10 of FIG. 1 provides for efficient collection of information regarding the time of occurrence of events and the number of events which have occurred. This digital timer apparatus is particularly well suited to applications requiring a determination of the angular velocity of a rotating member, such as an automotive wheel in an anti-lock brake system (ABS) or a shaft in an automotive transmission. Several well known techniques exist for collecting angular velocity data. The most common techniques rely on a toothed wheel, or gear, which rotates with the member to be monitored. As each tooth on the wheel passes a sensor, which may be magnetic, optical or some other type of sensor, it creates an electrical pulse. Thus, an electrical signal consisting of a train of pulses of varying frequency is generated. One common method for calculating angular velocity from such a signal is to count the number of pulses which occur in a given period of time. This method is economical, requiring only a pulse accumulator, and does not generate an excessive number of interrupt requests, but is inaccurate when the number of pulses occurring during the given period of time is relatively small. Another known method is to carefully measure the time between adjacent pulses. This method is also relatively economical, requiring a free running counter and a capture register, and may be extremely accurate; however, this method requires generation of an interrupt request for each pulse and requires, in order to preserve accuracy, that the frequency at which the free running counter is clocked be significantly higher than the highest expected pulse rate of the incoming signal. A third known method is a combination, in a sense, of the first two. It involves counting the number of pulses occurring during a known interval of time and accurately measuring the time between the last pulse preceding the interval and the last pulse occurring during the interval. This method can be more accurate than the second method, but requires only as many interrupt requests as the first method and requires the same hardware as both methods combined. Digital timer apparatus 10, as is apparent, is capable of performing all three methods of angular velocity determination, as is deemed appropriate for any particular application. In addition, digital timer apparatus 10 may reduce the requirement for a highly precise sensor in some applications. By measuring the time between adjacent edges over a multiple edge period, apparatus 10 inherently averages, or filters, inaccuracies caused by imprecise spacing of the teeth on the sensor. Permitting the use of less precise sensors can represent a significant cost saving in some applications.

The fact that the then-current values of the capture register 14 and the pulse accumulator 20 are stored in the holding registers 16 and 22, respectively, at the same time that the interrupt signal is generated makes the system less sensitive to long or indeterminate interrupt latentcy (the time between the generation of an interrupt request signal and the response of the CPU to that request). Digital timer system 10 will continue to collect data without disturbing the data in holding registers 16 and 22 as long as the main CPU responds to the interrupt request and retrieves the data from the holding register prior to the next interrupt request.

Figure 9:
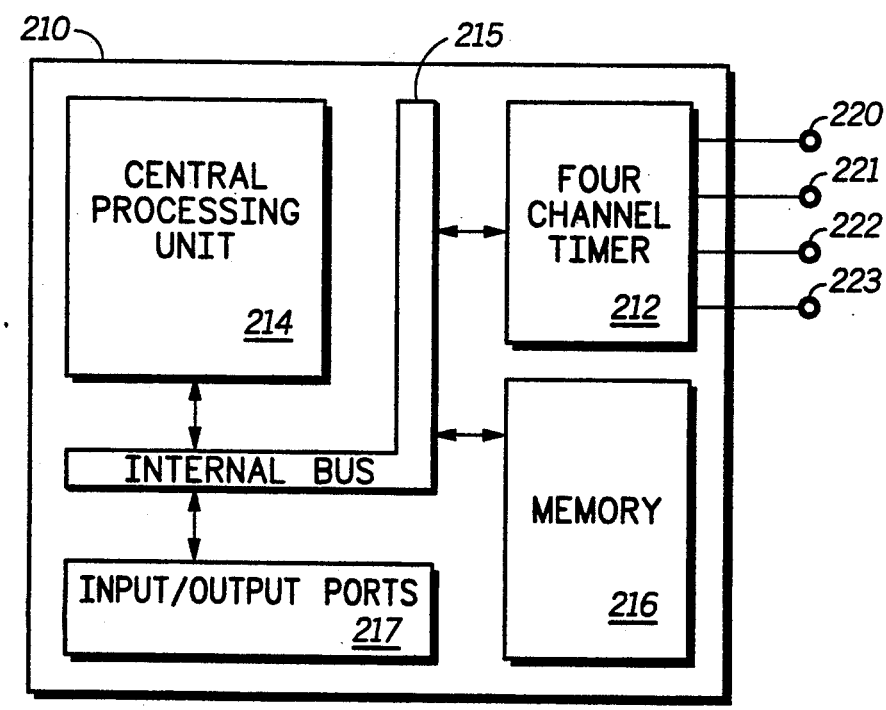
FIG. 9 illustrates, in block diagram form, an integrated circuit microcontroller incorporating a four channel digital timer apparatus.

As is apparent to one of skill in the art, the illustration of FIG. 1 omits certain details of digital timer apparatus 10. These details are illustrated in FIGS. 2-8, which illustrate a particular embodiment of the present invention, in which those elements illustrated in FIG. 1 are denominated with the same reference numerals when they appear. FIGS. 9 and 10 illustrate the integration of a four-channel timer sub-system comprising four of the digital timer apparatuses of FIGS. 1-8, into an integrated circuit microcontroller. Throughout FIGS. 2–8, various control register bits, interrupt flag bits and interrupt enable bits are referred to in somewhat summary form. The register map of FIG. 10 describes these various bits in a different form.

FIG. 2 illustrates, partially in block diagram form and partially in logic diagram form, free running counter 12 of FIG. 1. In general, free running counter 12 comprises a 16-bit up counter 30, prescaler logic 32 and interrupt logic 34.

Prescaler logic 32 further comprises a prescaler 36 having an input connected to a source of a clock signal, a control input and an output producing a scaled clock signal. The control input of prescaler 36 is coupled to receive a pair of signals corresponding to the value of two select bits 38. Select bits 38 are control bits which reside in a control register and which select the divide ratio of prescaler 36. In this particular embodiment, the divide ratio can be 1, 4, 8 or 16, depending on the value of the select bits. That is, the frequency of the scaled clock signal provided at the output of prescaler 36 can be the same as the frequency of the clock signal provided to the input of prescaler 36, of one fourth of the input clock signal, or one eighth of the frequency of the input clock signal or one sixteenth of the frequency of the input clock signal.

The scaled clock frequency signal is provided as a clock input to 16-bit up counter 30. Accordingly, 16-bit up counter 30 increments its contents once each full cycle of the scaled clock signal. When up counter 30 reaches its full value (hexadecimal FFFF), the next clock cycle causes it to "roll-over" to a count of hexadecimal 0000 and to produce an active signal at its overflow output. Up counter 30 will continue to repeat the process of incrementing up to FFFF, rolling-over to 0000 and producing an active overflow signal as long as the supply of the scaled clock signal continues.

The overflow output of up counter 30 is connected to a flag bit 40 of a register. Each time up counter 30 rolls over, the flag bit 40 will be set. The flag bit 40 is connected to provide an input to AND gate 42. The other input of AND gate 42 is provided by an enable bit 44. If enable bit 44 and flag bit 40 are both set, an active interrupt signal is generated. This interrupt signal is provided to a CPU (see FIG. 9) for handling. As is apparent to one skilled in the art, the CPU must also be capable of setting and clearing enable bit 44 and of clearing flag bit 40. The logic necessary to provide these functions is not shown, but is well known.

Up counter 30 also includes an output coupled to provide a multi-bit input to selective coupling logic 46. The output of selective coupling logic 46 is coupled to a data bus 48. A read control signal is connected to the control input of selective coupling logic 46. The CPU (FIG. 9), by providing address and control signals appropriate for activating the read control signal connected to selective coupling logic 46, is able to read a data value from up counter 30 into, for instance an accumulator register for further manipulation. In some circumstances, the arrangement by which this occurs may be slightly more complicated than is shown here. For instance, if data bus 48 is 8 bits wide, as will sometimes be the case in microcontrollers which implement this invention, storing a 16 bit value in up counter 30 will require two successive bus cycles, two items of selective coupling logic, and two different read control signals. In this case, some care must be taken to assure that the value retrieved during the second of the two bus cycles has not been changed relative to the value read during the preceding bus cycle by an intervening event. This is a well known problem, referred to as coherency, which has a number of well known solutions, including the addition of buffering logic and the blocking of inputs between the two bus cycles. While no provisions are shown here for writing a value to up counter 30, it may be advantageous to permit writes to the counter during special modes of operation used for testing purposes.

FIG. 3 illustrates, partially in block diagram form and partially in logic diagram form, the interval timer 18 of FIG. 1. The central component of interval timer 18 is a 16bit down counter 50. Down counter 50 is a well-known apparatus which decrements its contents by one each time an active signal is present at its count input. The count input of down counter 50 is connected to the output of an AND gate 52. When the value of the contents of down counter 50 reach zero an active signal is generated at the zero output of down counter 50. Down counter 50 then stops decrementing unless it is re-load and counting is re-enabled, as described below. The zero output of down counter 50 is coupled to one input of AND gate 104. The other input of AND gate 104 is connected to an enable bit of a register. Enable bit 106, which can be set or cleared by the CPU (FIG. 9) permits the effective disconnection of down counter 50 from the remainder of the system. The output of AND gate 104 is connected to a node 109. A force bit 108 of a register is also connected to node 109. Node 109 is coupled to the reset input of pulse accumulator 20, to the control inputs of selective coupling logic 26 and selective coupling logic 28 (FIG. 1) and to the wait for latch logic of certain control registers (FIG.s 7 and 8). The signal at node 109 is referred to hereinbelow as the zero signal. Accordingly, through the enable bit 106 and the force bit 108, a user of digital timer apparatus 10 is permitted to select whether down counter 50 is enabled to trigger the operation of the selective coupling logic 26 and 28, the resetting of pulse accumulator 20 and the triggering of the wait for latch feature of certain control registers and also to force the operation of those functions by simply setting force bit 108.

The zero output of down counter 50 is also connected to a flag bit 54 of a register. Accordingly, each time down counter 50 rolls over, the flag bit 54 will be set. The flag bit 54 is connected to provide an input to AND gate 56. The other input of AND gate 56 is provided by an enable bit 58. If enable bit 58 and flag bit 54 are both set, an active interrupt signal is generated. This interrupt signal is provided to a CPU (see FIG. 9) for handling. As is apparent to one skilled in the art, the CPU must also be capable of setting and clearing enable bit 58 and of clearing flag bit 54. The logic necessary to provide these functions is not shown, but is well known.

The source of clock signals for down counter 50 is prescaler logic 61. Prescaler logic 61 further comprises a prescaler 62 having an input connected to a source of a clock signal, a control input and an output producing a scaled clock signal. The control input of prescaler 62 is coupled to receive a pair of signals corresponding to the value of two select bits 64. Select bits 64 are control bits which reside in a control register and which select the divide ratio of prescaler 62. In this particular embodiment, the divide ratio can be 1, 4, 8 or 16, depending on the value of the select bits. That is, the frequency of the scaled clock signal provided at the output of prescaler 62 can be the same as the frequency of the clock signal provided to the input of prescaler 62, of one fourth of the input clock frequency, or one eighth of the input clock frequency or one sixteenth of the input clock frequency. In this particular embodiment the clock signal provided as the input to prescaler logic 61 is the same clock signal provided to the input of prescaler logic 32 (FIG. 2), but this is certainly not required. Select bits 64 are not the same as select bits 38 (FIG. 2), as will be more apparent from description of FIG. 10, below. The scaled clock signal provided at the output of prescaler 62 is connected to one input of AND gate 52.

Interval timer 18 is capable of operating in two modes. In a first operating mode, down counter 50 is loaded with a value provided by the CPU (see FIG. 9) via data bus 48, is enabled to count down, and stops counting immediately after having reached zero and generated a zero signal. In this mode, no further activity occurs until a new value is loaded into down counter 50 from data bus 48. Accordingly, this mode of operation results in the production of a single active zero signal after a period of time has elapsed subsequent to the enablement of the system. The period of time is, of course, determined by the setting or prescaler 62 and the starting value loaded into down counter 50. In the second operating mode, down counter 50 is continuously enabled to count and is re-loaded with a value contained in a 16-bit re-load register 60 each time it reaches zero and generates an active zero signal. Thus, the second mode of operation will result in the continuous production of an active zero signal at a frequency determined by the setting of prescaler 62 and the value stored in 16-bit register 60. Mode logic 66, load logic 68 and clock enable logic 70 cooperate to operate interval timer 18 in the two modes just described.

Mode logic 66 comprises an interval mode bit 72 having an output connected to a first input of an AND gate 74 and also to an input of an inverter 76. Mode logic 66 further comprises an AND gate 78 which has one input coupled to the output of inverter 76. The second inputs of AND gates 74 and 78 are both connected to the zero output of down counter 50. Interval mode bit 72 is a single bit in a control register (see FIG. 10) which, when set (equal to logic 1) places interval timer 18 in the second operating mode described above and when cleared (equal to logic zero) places interval timer 18 in the first operating mode described above.

Load logic 68 comprises selective coupling logic 80 and selective coupling logic 82. Selective coupling logic 80 has a 16-bit input connected to an output of 16-bit register 60, a 16-bit output connected to a 16-bit input of down counter 50 and a control input connected to the output of AND gate 74. Accordingly, selective coupling logic 80 couples the output of 16-bit register 60 to the input of down counter 50 when interval mode bit 72 is set and when the zero signal is active. Selective coupling logic 82 has a 16-bit input connected to data bus 48, a 16-bit output connected to the input of down counter 50 and a control input connected to receive a write control signal. Accordingly, selective coupling logic 82 couples data bus 48 to the input of down counter 50 when the write control signal is active. As mentioned above, the illustrated apparatus for loading 16-bit down counter 50 from data bus 48 will be slightly more complex in the case of an 8bit data bus rather than a 16-bit data bus. As is apparent to one of skill in the art, the write control signal connected to selective coupling logic 82 is not the same write control signal connected to the control input of selective coupling logic 46 (FIG. 2). Rather, read/write mode logic and address decode logic not shown in these figures determines from address and control signals produced by the CPU (FIG. 9) which of the many read and write control signals to activate.

Clock enable logic 70 includes a set-reset latch 84, an OR gate 86 and AND gate 52. Latch 84 has a set input connected to receive the same write control signal which is connected to the control input of selective coupling logic 82. Latch 84 also has a reset input connected to the output of AND gate 78. Latch 84 also has an output, which is asserted when the signal coupled to the set input of latch 84 is asserted and remains asserted until the signal coupled to the reset input of latch 84 is asserted, which is connected to one input of OR gate 86. The other input of OR gate 86 is connected to the output of interval mode bit 72. The output of OR gate 86 is connected to one input of AND gate 52.

Selective coupling logic 88 has a 16-bit input connected to data bus 48 and a 16-bit output connected to an input of 16-bit register 60. A control input of selective coupling logic 88 is connected to receive a write control signal. This write control signal is not the same write control signal as is described elsewhere in this and the other drawings. Selective coupling logic 88 provides the means by which the CPU (FIG. 9) provides to 16-bit register 60 the re-load value to be used when interval timer 18 is in the second operating mode. Once again, this logic would be modified in the case of an 8-bit data bus rather than a 16-bit data bus.

Read logic 90 comprises a read mode bit 92, an inverter 94, an AND gate 96, and AND gate 98, selective coupling logic 100 and selective coupling logic 102. Read mode bit 92 is a single bit in a control register (see FIG. 10) which controls which of 16-bit down counter 50 and 16-bit register 60 is read onto data bus 48 in response to a read operation initiated by the CPU (FIG. 9). The output of read mode bit 92 is connected to an input of an inverter 94 and also to one input of an AND gate 96. The output of inverter 94 is connected to one input of an AND gate 98. The second inputs of AND gate 96 and AND gate 98 are each connected to receive a read control signal.

Selective coupling logic 100 has a 16-bit input connected to an output of 16-bit register 60, a 16-bit output connected to data bus 48 and a control input connected to the output of AND gate 96. Selective coupling logic 102 has a 16-bit input connected to an output of 16-bit down counter 50, a 16-bit output connected to data bus 48 and a control input connected to the output of AND gate 98. Accordingly, when read mode bit 92 is cleared, the read control signal will activate selective coupling logic 102 and cause the contents of down counter 50 to be coupled to data bus 48. Alternatively, when read mode bit 92 is set, the read control signal will activate selective coupling logic 100 and cause the contents of 16-bit register 60 to be coupled to data bus 48. As mentioned above, the read logic described here would require some modification in the case of an 8-bit data bus.

An alternative to the design of read logic 90, which uses a single read control signal and a mode bit to select whether to read the pre-load register 60 or the down counter 50, is to use two separate read control signals. Read logic 90 effectively places the two registers at one address location in the memory map of the CPU (FIG. 9). The alternative is to assign two separate address locations to the two registers and to eliminate the need for a read mode bit. The alternative illustrated in FIG.

3 requires fewer entire registers in the memory map of the CPU (FIG. 9), but requires that an individual control bit location is available to implement read mode bit 92. The other alternative requires two addresses in the memory map, but eliminates the need for a control bit location.

Interval timer 18 is one example of an interval timer suitable for use with the present invention. However, interval timers in general are relatively common features of digital control systems and many variations of the interval timer described above might be readily substituted.

Figure 4:
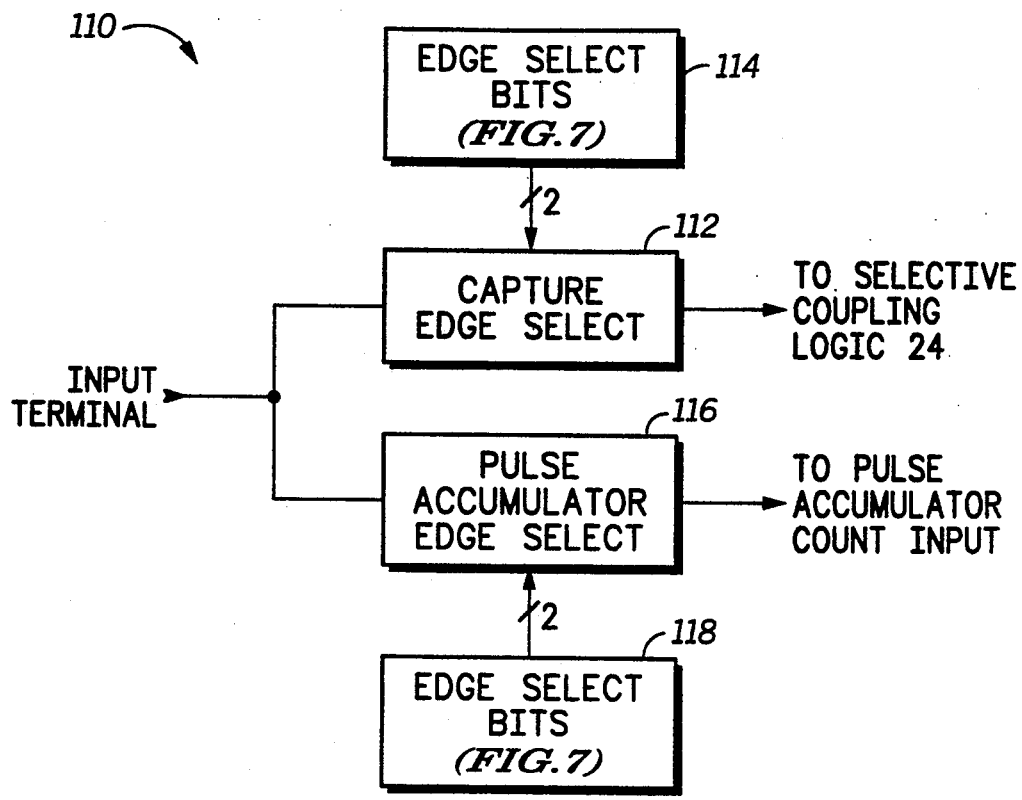
FIG. 4 illustrates, in block diagram form, an edge select apparatus useful in the apparatus of FIG. 1.

FIG. 4 illustrates, in block diagram form, edge selection logic 110. Edge selection logic 110 is coupled between the input terminal and both the control input of selective coupling logic 24 and the count input of pulse accumulator 20 (FIG. 1). Edge selection logic 110 selects, under control of the CPU (FIG. 9) which signal transitions appearing on the input terminal will cause selective coupling logic and the pulse accumulator to be activated.

Edge selection logic includes capture edge select logic 112, edge select bits 114, pulse accumulator edge select logic 116 and edge select bits 118. Capture edge select logic 112 has an input connected to the input terminal and an output connected to selective coupling logic 24 (FIG. 1). Capture edge select logic also has a control input connected to receive the values of two edge select bits 114. Edge select bits 114 are two bits in a control register (see FIG.s 7 and 10) which select whether the desired active transition on the input terminal is a low-to-high (rising) transition, a high-to-low (falling) transition, any transition or no transition (which selection disables capture edge selection logic 112). Capture edge selection logic 112, when enabled by edge select bits 114, detects all transitions occurring at the input terminal and, when a selected active transition occurs, produces an active output signal which activates selective coupling logic 24 (FIG. 1). When disabled by edge select bits 114, capture edge select logic 112 produces no active output signals, regardless of any transitions which occur on the input terminal.

Pulse accumulator edge select logic 116 and edge select bits 118 function in the same manner as described above. Edge select bits 118 are not the register bits as edge select bits 114, as is apparent from FIG. 10. Accordingly, it is possible to trigger pulse accumulator 20 and selective coupling logic 24 on either the same or different transitions occurring on the input terminal.

Figure 5:
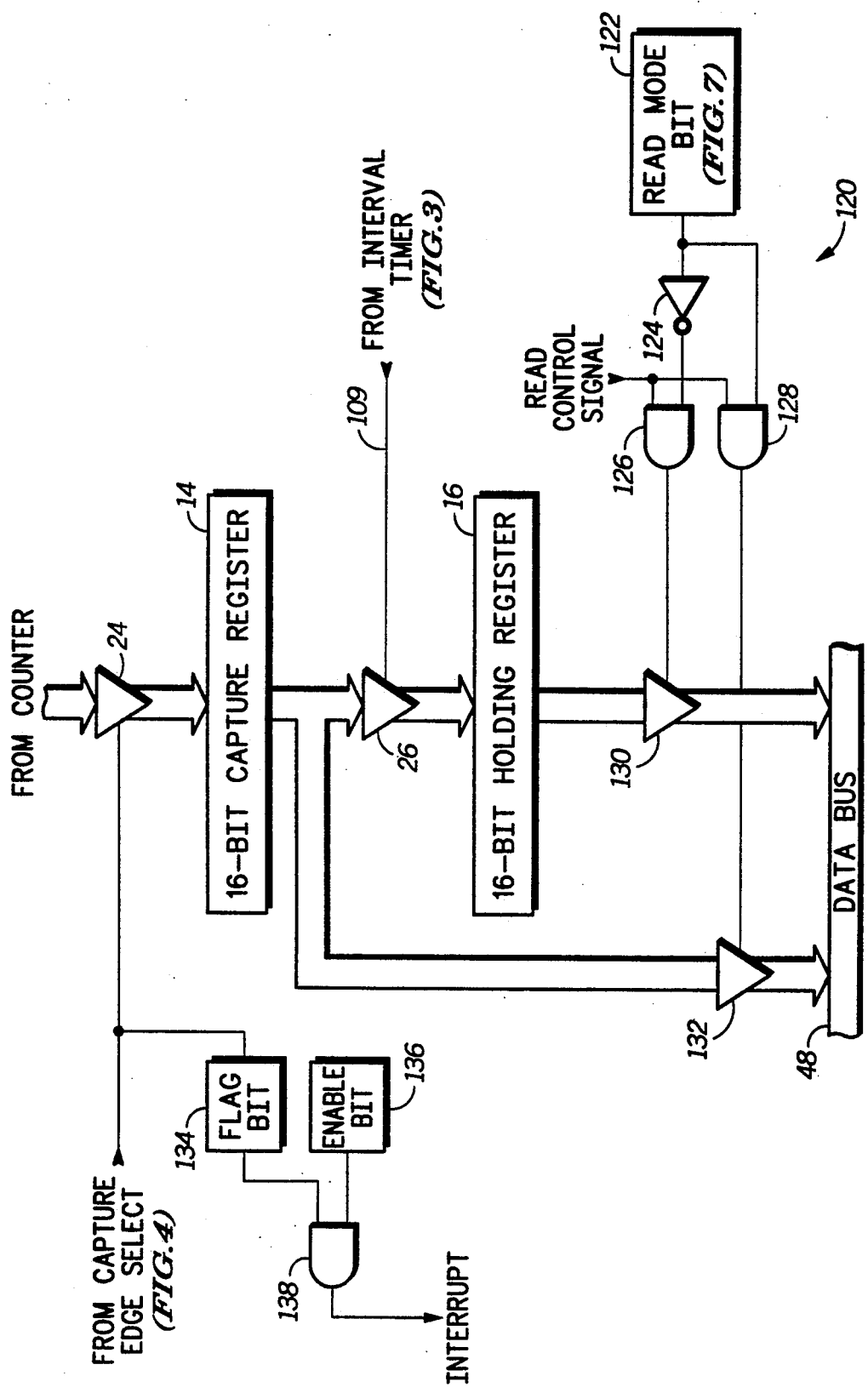
FIG. 5 illustrates, partially in block diagram form and partially in logic diagram form, the capture register and first holding register of FIG. 1.

FIG. 5 illustrates, partially in block diagram form and partially in logic diagram form, the details of capture register 14, holding register 16 and certain associated logic. A 16-bit input of selective coupling logic 24 is connected to receive an output signal from 16-bit up counter 30 (FIG. 2). A control input of selective coupling logic 24 is connected to receive the output of capture edge select logic 112 (FIG. 4). A 16-bit output of selective coupling logic 24 is connected to an input of 16-bit capture register 14. A 16-bit output of capture register 14 is connected to a 16-bit input of selective coupling logic 26. A control input of selective coupling logic 26 is connected to the zero output of 16-bit down counter 50 (FIG. 3). A 16-bit output of selective coupling logic 26 is connected to a 16-bit input of 16-bit holding register 16.

Read logic 120 comprises a read mode bit 122, inverter 124, AND gate 126, AND gate 128, selective coupling logic 130 and selective coupling logic 132. Read mode bit 122 is a single bit in a control register (see FIGS. 7 and 9), the state of which selects whether a read operation commenced by the CPU under software control reads the value in 16-bit capture register 14 or the value in 16-bit holding register 16. The output of read mode bit 122 is connected to an input of inverter 124 and to one input of AND gate 128. The output of inverter 124 is connected to one input of AND gate 126. A read control signal is connected to the other inputs of both AND gate 126 and AND gate 128. The output of AND gate 126 is connected to the control input of selective coupling logic 130. The output of AND gate 128 is connected to the control input of selective coupling logic 132. Selective coupling logic 130 has a 16-bit input connected to a 16-bit output of 16-bit holding register 16. A 16-bit output of selective coupling logic 130 is connected to data bus 48. Selective coupling logic 132 has a 16-bit input connected to a 16-bit output of 16-bit capture register 14 and a 16-bit output connected to data bus 48. The illustrated read logic would require some modification in the case of an 8-bit data bus, as mentioned above.

The signal from capture edge select logic 112 (FIG. 4) is also connected to a flag bit 134 of a register. Flag bit 134 will be set each time 16-bit capture register 14 is loaded with a new value. The flag bit 134 is connected to provide an input to AND gate 138. The other input of AND gate 138 is provided by an enable bit 136. If enable bit 136 and flag bit 134 are both set, an active interrupt signal is generated. This interrupt signal is provided to a CPU (see FIG. 9) for handling. As is apparent to one skilled in the art, the CPU must also be capable of setting and clearing enable bit 136 and of clearing flag bit 134. The logic necessary to provide these functions is not shown, but is well known.

Figure 6:
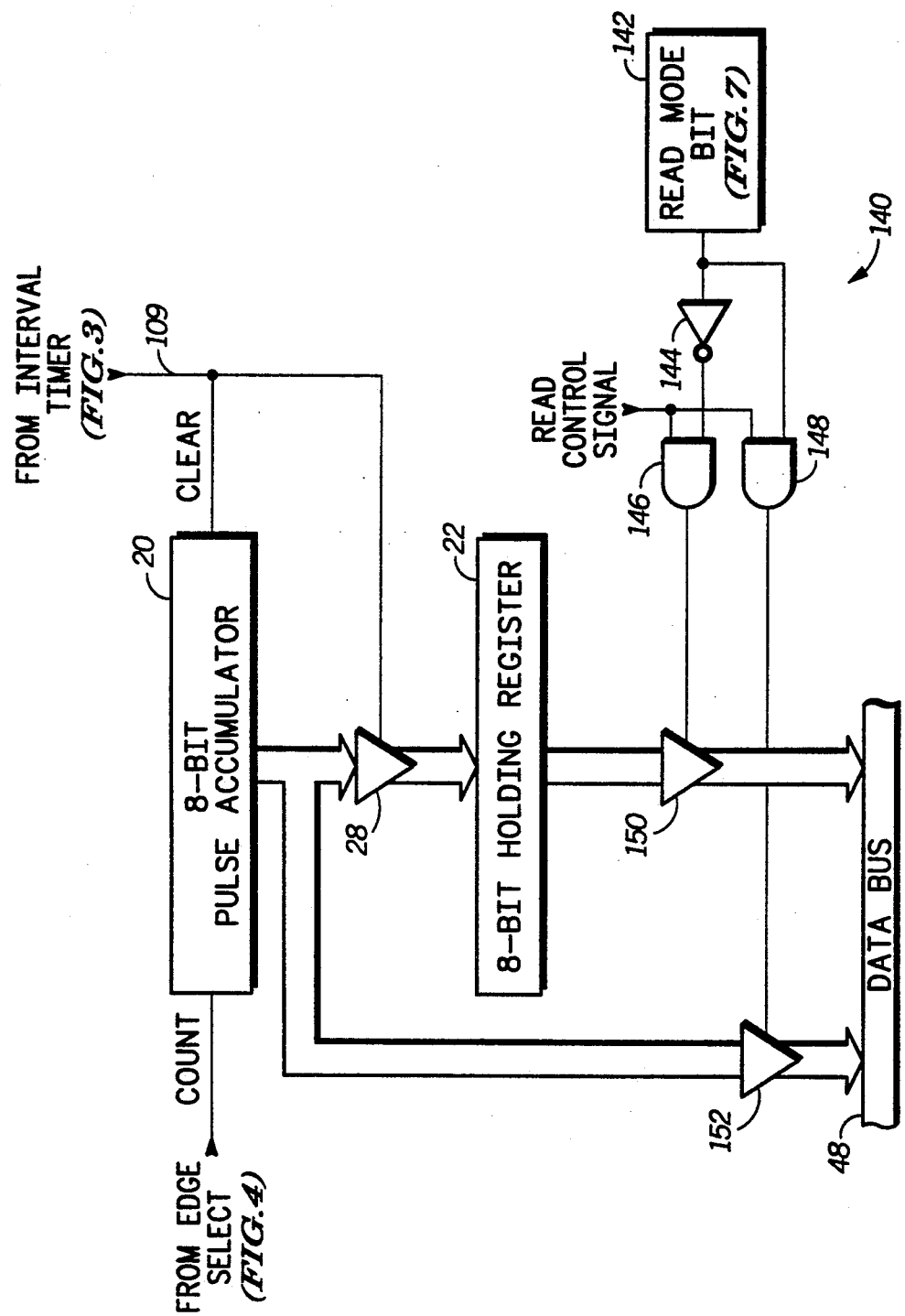
FIG. 6 illustrates, partially in block diagram form and partially in logic diagram form, the pulse accumulator and second holding register of FIG. 1.

FIG. 6 illustrates, partially in block diagram form and partially in logic diagram form, the details of pulse accumulator 20, holding register 22 and certain associated logic. Pulse accumulator 20 has an 8-bit capacity, permitting it to count up to 255 events before reaching its maximum capacity. The contents of pulse accumulator 20 are incremented by one each time an active signal is received at the count input. In this embodiment of the present invention, when pulse accumulator reaches its maximum capacity it simply stops incrementing when additional count pulses are received. Accordingly, a full-range count (hexadecimal $FF) indicates that 255 or more count pulses have been received since pulse accumulator 20 was last cleared. The count input of pulse accumulator 20 is connected to receive the output signal from pulse accumulator edge select logic 116 (FIG. 4). Pulse accumulator 20 also has a clear input. An active signal present at the clear input of pulse accumulator 20 causes the contents to be reset to all 0's. The clear input of pulse accumulator 20 is connected to receive the zero output signal from down counter 50 (FIG. 3). Although not illustrated here, pulse accumulator 20 is also writable, or presettable, by the CPU (FIG. 9). The logic necessary to implement this functionality will be apparent to one skilled in the art.

Selective coupling logic 28 has an 8-bit input connected to an 8-bit output of pulse accumulator 20 and an 8-bit output connected to an 8-bit input of 8-bit holding register 22. The control input of selective coupling logic 28 is connected to receive the zero output signal from 16-bit down counter 50 (FIG. 3).

Read logic 140 comprises a read mode bit 142, inverter 144, AND gate 146, AND gate 148, selective coupling logic 150 and selective coupling logic 152. Read mode bit 142 is a single bit in a control register (see FIGS. 7 and 9), the state of which selects whether a read operation commenced by the CPU under software control reads the value in 8-bit pulse accumulator 20 or the value in 8-bit holding register 22. The output of read mode bit 142 is connected to an input of inverter 144 and to one input of AND gate 148. The output of inverter 144 is connected to one input of AND gate 146. A read control signal is connected to the other inputs of both AND gate 146 and AND gate 148. The output of AND gate 146 is connected to the control input of selective coupling logic 150. The output of AND gate 148 is connected to the control input of selective coupling logic 152. Selective coupling logic 150 has an 8-bit input connected to an 8-bit output of 8-bit holding register 22. An 8-bit output of selective coupling logic 150 is connected to data bus 48. Selective coupling logic 152 has an 8-bit input connected to an 8-bit output of 8-bit pulse accumulator 20 and an 8-bit output connected to data bus 48.

Certain of the control register bits described above, namely the capture edge select bits, the pulse accumulator edge select bits and the read mode bits for the capture register/holding register pair and the pulse accumulator/holding register pair, are implemented in a novel control register. A feature of this control register is its ability to permit the CPU, under software control, to determine whether newly written values of the control bits in the register are to be immediately effective or are to be effective only upon the occurrence of some later event. This feature is referred to as the wait for latch feature. In the preferred embodiment, the event upon which effectiveness of the control bit values can be conditioned is the next active zero signal from 16-bit down counter 50, which causes the latching of the capture and pulse accumulator values into their respective holding registers.

Figure 7:
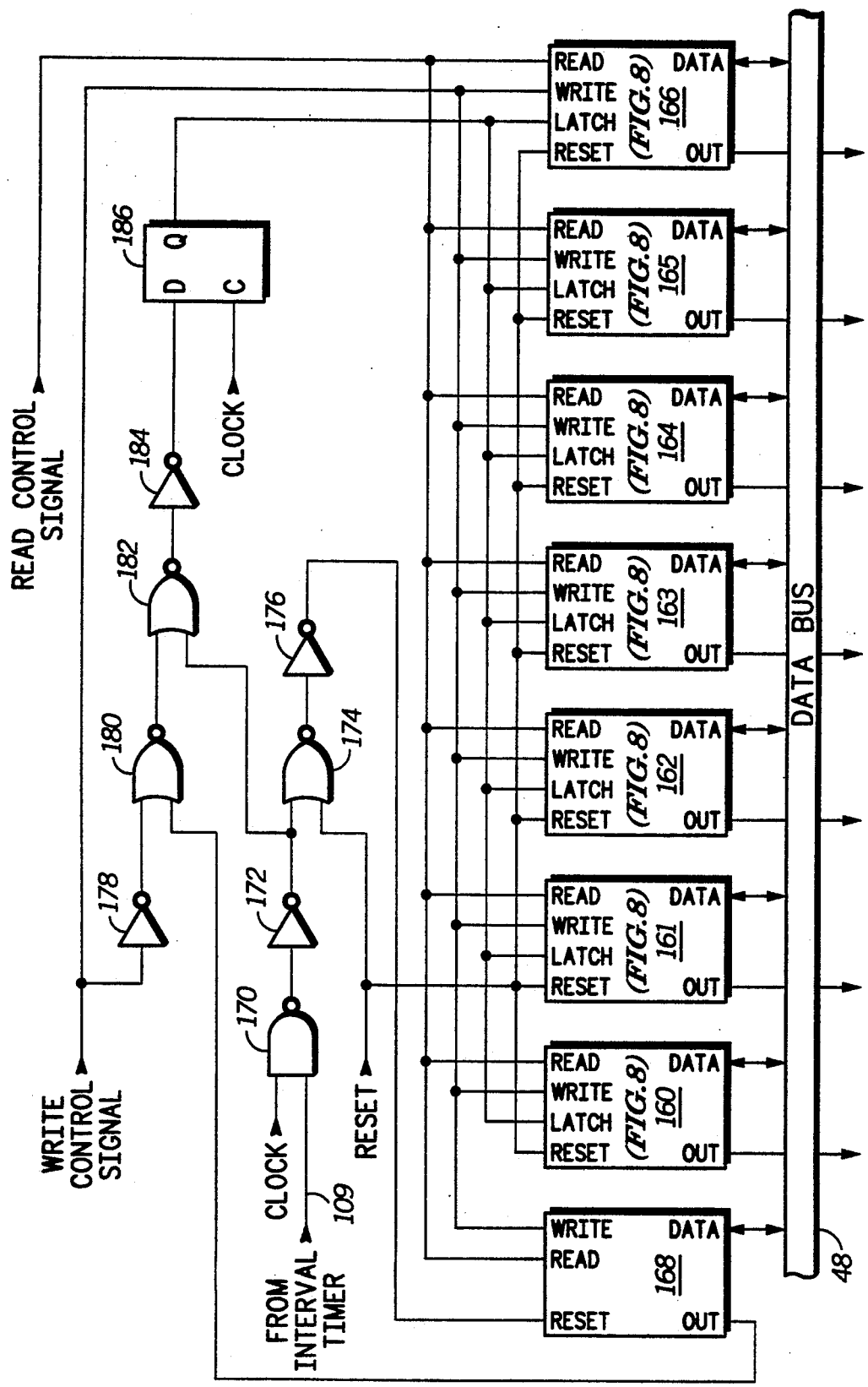
FIG. 7 illustrates, partially in block diagram form and partially in logic diagram form, a register according to the present invention which is useful with the apparatus of FIG. 1.

FIG. 7 illustrates, partially in block diagram form and partially in logic diagram form, an 8-bit control register and associated logic suitable for implementing the selectively delayed control bit activity just described. The register itself comprises seven identical, specially-designed latches 160-166 occupying bit positions 0-6 of the register and a single, conventional latch 168 occupying bit position 7, the most significant bit of the control register. Each of the specially-designed latches 160-166, which will be more fully described with reference to FIG. 8, below, has reset, latch, write and read control inputs, a bidirectional connection, labeled "data", to the appropriate bit line of data bus 48 and a single control signal output labeled "out". This output provides the control bits to the various logic element such as capture edge select logic 112 and pulse accumulator edge select logic 116 (FIG. 4). Conventional latch 168 has reset, read and write control signal inputs, a bidirectional connection to data bus 48 and a single control signal output. Latch 168 is designed such that an active signal coupled to the reset control input causes the control signal output to become inactive (logic 0).

A write control signal is connected to the write control input of each of latches 160-166 and 168. A read control signal is connected to the read control inputs of each of latches 160-166 and 168. A reset control signal is connected to the reset control inputs of each of latches 160-166 and 168.

A first portion of the associated logic comprises NAND gate 170, inverter 172, NOR gate 174 and inverter 176. The zero output signal from 16-bit down counter 50 is connected to one input of NAND gate 170 and a clock signal is connected to the other input thereof. The output of NAND gate 170 is connected to an input of inverter 172. The output of inverter 172 is connected to an input of NOR gate 174. The other input of NOR gate 174 is connected to receive the reset control signal. The output of NOR gate 174 is connected to the input of inverter 176. The output of inverter 176 is connected to the reset control input of latch 168.

A second portion of the associated logic comprises an inverter 178, a NOR gate 180, a NOR gate 182, an inverter 184 and a master-slave flip-flop 186. The write control signal is connected to the input of inverter 178. The output of inverter 178 is connected to one input of NOR gate 180. The other input of NOR gate 180 is connected to the control signal output of latch 168. The output of NOR gate 180 is connected to one input of NOR gate 182. The other input of NOR gate 182 is connected to the output of inverter 172. The output of NOR gate 182 is connected to the input of inverter 184. The output of inverter 184 is connected to the D input of master-slave flip-flop 186. The clock input of flip-flop 186 is connected to receive a clock signal. The data, or Q, output of flip-flop 186 is connected to the latch control inputs of latches 160-166.

Figure 8:
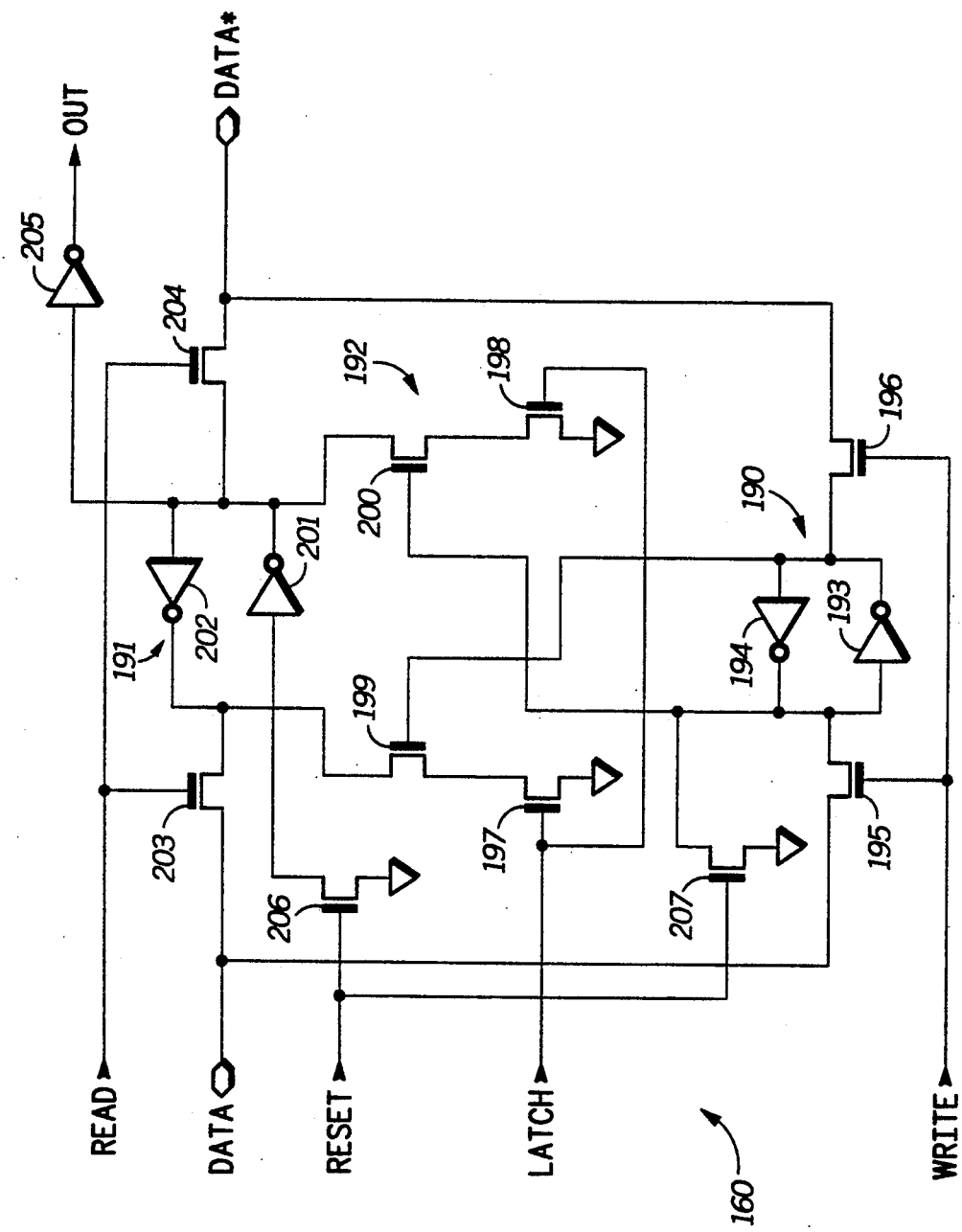
FIG. 8 illustrates, in circuit diagram form, a first latch circuit of FIG. 7.

FIG. 8 illustrates, in circuit diagram form, the details of latch 160 of FIG. 7. Essentially, latch 160 includes a first storage element 190, a second storage element 191, transfer logic 192 and the associated logic necessary to read, write and reset the latch. A write operation directed to latch 160 causes data to be stored in storage element 190. Transfer logic 192 causes the value held in storage element 190 to be transferred to storage element 191 upon the occurrence of an active signal at the latch control input. The state of storage element 191 controls both the state read onto data bus 48 in response to a read operation directed to latch 160 and the state of the control output.

Storage element 190 comprises a first inverter 193 and a second inverter 194 connected in the conventional cross-coupled configuration. An N-channel MOS transistor 195 has a first current electrode connected to the output of inverter 194 and the input of inverter 193 and a second current electrode connected to a single data line of data bus 48. In the case of latch 160, this data line would be bit 7 of data bus 48. A control gate of transistor 195 is connected to the write control input of latch 160. Transistor 195 is conductive when the write control signal is active. An N-channel MOS transistor 196 has a first current electrode connected to the input of inverter 194 and the output of inverter 193 and a second current electrode connected to the logical complement of the data bus line to which transistor 195 is connected. The control electrode of transistor 196 is also connected to the write control input of latch 160. When the write control signal is active, a data value is transferred from bit 7 of data bus 48 into storage element 190.

Transfer logic 192 includes N-channel MOS transistor 197, N-channel MOS transistor 198, N-channel MOS transistor 199 and N-channel MOS transistor 200. Transistor 197 has a first current electrode coupled to a voltage source, commonly referred to as ground, and a second current electrode connected to a first current electrode of transistor 199. Transistor 198 has a first current electrode coupled to ground and a second current electrode connected to a first current electrode of transistor 200. The control electrodes of transistors 197 and 198 are connected to the latch control input of latch 160. Transistors 197 and 198 are conductive when the signal connected to the latch control input of latch 160 is active. The control electrode of transistor 199 is connected to the output of inverter 193 and the input of inverter 194. The control electrode of transistor 200 is connected to the output of inverter 194 and the input of inverter 193. Accordingly, one of transistor 199 and transistor 200 is always conductive, but both are never conductive at the same time. Although described as "transfer logic", it should be noted that transistors 197, 198, 199 and 200 do not destroy the contents of storage element 190 when transferring those contents to storage element 191.

Storage element 191 comprises inverter 201 and inverter 202 connected in the conventional cross-coupled configuration. The second current electrode of transistor 199 is connected to the input of inverter 201 and the output of inverter 202. The second control electrode of transistor 200 is connected to the input of inverter 202 and the output of inverter 201. Accordingly, when the latch control input of latch 160 is active, the data bit stored in storage element 190 is copied into storage element 191.

An N-channel MOS transistor 203 has a first current electrode connected to the output of inverter 202 and the input of inverter 201 and a second current electrode connected to the data bus line. An N-channel MOS transistor 204 has a first current electrode connected to the output of inverter 201 and the input of inverter 202 and a second current electrode connected to the logical complement of the data bus line. The control electrodes of transistors 203 and 204 are connected to the read control input of latch 160. Transistors 203 and 204 are conductive when the read control signal is active. Accordingly, when the read control signal is active, the value stored in storage element 191 is read onto data bus 48. As will be apparent to one skilled in the art, while the choice was made in designing the present embodiment of the invention to read storage element 191 (the "active" storage element), one might readily change this so that storage element 190 (the "pending" storage element) would be read in response to the read control signal. Another alternative would be make provision for reading either storage element based upon a control bit or different addresses.

An inverter 205 has an input connected to the output of inverter 201 and the input of inverter 202 and has an output connected to the control signal output of latch 160.

An N-channel MOS transistor 206 has a first current electrode connected to the output of inverter 202 and the input of inverter 201. The second current electrode of transistor 206 is connected to ground. The control electrode of transistor 206 is connected to the reset control input of latch 160. An N-channel MOS transistor 207 has a first current electrode connected to the output of inverter 194 and the input of inverter 193. The second current electrode of transistor 207 is connected to ground. The control electrode of transistor 207 is connected to the reset control input of latch 160. Accordingly, both storage element 190 and storage element 191 are reset to a known state when the signal connected to the reset control input of latch 160 is active.

The control register illustrated in FIGS. 7 and 8 operates in two modes. In the first mode, when the data value stored in latch 168 is such that its output is inactive (logic 0), the write control signal will control the state of flip-flop 186 and, therefore, the state of the latch control input of latches 160–166. In other words, a write operation directed to the control register will simultaneously cause the storing of the new data values into both storage elements in each of latches 160–166. Thus, the control signal outputs of latches 160–166 will reflect the newly written data values immediately after the write operation is completed. In the second mode, when the data stored in latch 168 is such that its output is active (logic 1), the write control signal is prevented by NOR gate 180 from controlling the state of flip-flop 186. Instead, the zero signal from 16-bit down counter 50 (FIG. 3) controls the state of flip-flop 186. Accordingly, a write operation directed to the control register will cause the storing of the new data values into the first storage elements (e.g., element 190) of each of latches 160–166, but the second storage elements (e.g., element 191) of each of latches 160–166 will continue to reflect the previous values. The next occurrence of an active zero signal will cause the latch control input of each of latches 160–166 to become active, thus transferring the newly written data values from the first to the second storage elements and changing the control signal outputs. In addition, the active zero signal causes latch 168 to be reset, returning its output to an inactive state.

The register of FIGS. 7 and 8 also provides a status monitoring capability in that a read of the register can be used to determine, by examining the state of bit 7, whether previously written values of the remaining bits are "pending".

It should be noted that the design of the control register of FIGS. 7 and 8 is such that a single write operation which simultaneously sets latch 168 to one and also writes new control values to latches 160–166 will result in the effectiveness of the new control values to be delayed until the next active zero signal. It is not necessary to "pre-set" latch 168 to one before writing the new control values.

It should be noted that the CPU (FIG. 9) which forms a portion of the particular embodiment of the present invention being described does not support "true" bit addressing. In other words, the smallest unit of information which can be addressed is one byte. Accordingly, for an 8-bit register such as is illustrated in FIGS. 7 and 8, there is a single write control signal and a single read control signal. (Instructions which modify or test a single bit are supported by means of atomic read-modify-write operations.) In other embodiments of the present invention which use a CPU which does support true bit addressing, the implementation of the register of FIGS. 7 and 8 will be different. Those changes will be apparent to those skilled in the art.

FIG. 9 illustrates, in block diagram form, an integrated circuit microcontroller 210 which incorporates a four-channel digital timer apparatus according to the present invention. Microcontroller 210 includes a central processing unit (CPU) 214, an internal bus 215, four-channel digital timer 212, memory 216 and input/output ports 217. As is apparent to those skilled in the art, microcontroller 210 might also incorporate other elements such as an analog-to-digital converter, serial communication devices, and other familiar devices. Central processing unit 214 is, in the preferred embodiment of the present invention, the M68HC11 CPU which is described in a manual titled "M68HC11 Reference Manual" published by Motorola, Inc. in 1988.

Four-channel timer 212 comprises four identical digital timers of the type described above with reference to FIGS. 1–8, except that a single free-running counter (FIG. 2) and interval timer (FIG. 3) serve all four channels. In other words, all four capture registers are coupled through selective coupling logic to a single 16-bit up counter. A single 16-bit down counter provides the zero signal to all four pulse accumulators and holding register load logic. Each of the four channels is connected to receive input signals from one of pins 220, 221, 222 and 223. Timer 212 is also coupled bi-directionally to internal bus 215. The various registers of timer 212 are addressable by CPU 214 under software control.

It should be noted that increasing the number of channels from one to four does not increase the rate at which interrupts are generated. Because a single interval timer serves all four (or more) channels, and because the time-out period of the interval timer determines the rate at which interrupt requests are generated, one may add channels to the system without increasing the interrupt rate. However, because the CPU 214 must typically read both the capture holding register and the pulse accumulator holding register for each channel each time an interrupt request is generated, the amount of time required for interrupt service does increase as the number of channels is increased.

FIG. 10 illustrates, in table form, that portion of the memory map of CPU 214 which is occupied by timer 212. The addresses of the various registers are set forth along the left-hand edge of the table. The addresses are specified in standard hexadecimal (base 16) notation. The leading x indicates that the most significant 4 bits of the address are variable. CPU 214 is an 8-bit CPU. Accordingly, 16-bit registers appear as two adjacent 8-bit registers, with the most significant byte of the 16-bit value appearing at the lower address. The mnemonic label of each register appears at the right hand edge of the table. In the case of individual register bits which have mnemonic labels, the labels appear within the boxes representing those bit locations.

The 16-bit register which appears at addresses $x050 and $x051 has the mnemonic label ICCNT(hi) and ICCNT(lo), respectively. This register is the 16-bit up counter 30 (FIG. 2). The 16-bit register at addresses $x052 and $x053 has the mnemonic label DCCNT(hi) and DCCNT (lo), respectively, and is the 16-bit down counter 50 (FIG. 4). The 16-bit register at addresses $x054 and $x055 has the mnemonic label ICC1 (hi) and ICC1(lo), respectively, and is the capture register 14 (FIG. 5) for channel 1 of timer 212. The 16-bit register at addresses $x056 and $x057 has the mnemonic label ICC2 (hi) and ICC2(lo), respectively, and is the capture register 14 (FIG. 5) for channel 2 of timer 212. The 16-bit register at addresses $x058 and $x059 has the mnemonic label ICC3 (hi) and ICC3(lo), respectively, and is the capture register 14 (FIG. 5) for channel 3 of timer 212. The 16-bit register at addresses $x05A and $x05B has the mnemonic label ICC4 (hi) and ICC4(lo), respectively, and is the capture register 14 (FIG. 5) for channel 4 of timer 212. The 8-bit register at address $x05C has the mnemonic label PACC1 and is the pulse accumulator 20 (FIG. 6) for channel 1 of timer 212. The 8-bit register at address $x05D has the mnemonic label PACC2 and is the pulse accumulator 20 (FIG. 6) for channel 2 of timer 212. The 8-bit register at address $x05E has the mnemonic label PACC3 and is the pulse accumulator 20 (FIG. 6) for channel 3 of timer 212. The 8-bit register at address $x05F has the mnemonic label PACC4 and is the pulse accumulator 20 (FIG. 6) for channel 4 of timer 212.

The 8-bit register at address $x060 has the mnemonic label ICFLG and is a register containing all of the interrupt flag bits for timer 212. Bit 0 of ICFLG has the mnemonic label ICC1F and is the capture interrupt flag bit 134 for channel 1 of timer 212. Similarly, bits 1–3 have the labels ICC2F, ICC3F and ICC4F, respectively, and are the capture interrupt flags for channels 2–4, respectively. Bits 4 and 5 of ICFLG are not used. Bit 6 has the label ICOVF and is the free running counter overflow interrupt flag bit 40 (FIG. 2). Bit 7 has the label DCZF and is the down counter reached zero interrupt flag 54 (FIG. 3).

The 8-bit register at address $x061 has the label ICMSK and is a register containing all of the interrupt enable bits for timer 212. Each enable bit of ICMSK has a corresponding flag bit in ICFLG. The mnemonic labels and bit positions are self-explanatory.

The 8-bit register at address $x062 has the mnemonic label ICTCR1 and contains many of the control bits for channel 1 of timer 212. This register has five bits fields and is constructed as illustrated in FIGS. 7 and 8.

The two least significant bits of ICTCR1 bear the label PED1A and PED1B, respectively. These are the two pulse accumulator edge select bits 118 (FIG. 4) for channel 1. The four possible combinations of the values of these two bits encode the four possible settings of pulse accumulator edge select logic 116 (FIG. 4): disabled, rising edges only, falling edges only or any edge.

Bit 2 of ICTCR1 bears the mnemonic label PRD1H and is the pulse accumulator read mode control bit 142 (FIG. 6) for channel 1.

Bit 3 of ICTCR1 is not used.

Bits 4 and 5 of ICTCR1 bear the mnemonic labels CED1A and CED1B, respectively, and are the capture edge select bits 114 (FIG. 4) for channel 1.

Bit 6 of ICTCR1 bears the mnemonic label CRD1H and is the capture register read mode control bit 122 (FIG. 5) for channel 1.

Bit 7 of ICTR1 bears the mnemonic label WFLT1 and is the wait for latch control bit 168 (FIG. 7) for the ICTCR1 register. In other words, by setting bit 7 of ICTCR1 to 1 while writing new values into the remaining bits of ICTCR1, it is possible to delay the effect of the new values of the bits in positions 0–6 until after the next active zero signal from down counter 50 (FIG. 3).

The 8-bit registers at addresses $x063, $x064 and $x065 have the mnemonic labels ICTCR2, ICTCR3 and ICTCR4, respectively, and have the same functions for channels 2, 3 and 4, respectively, as ICTCR1 has for channel 1. The mnemonics of the various bit fields of ICTCR2, ICTCR3 and ICTCR4 are similar to those for ICTCR1.

The 8-bit register at address $x066 has the mnemonic label ICPRE and is the prescale control register for timer 212. Bits 0 and 1 of ICPRE have the mnemonic label ICPR0 and ICPR1, respectively, and are the select bits 38 for prescaler 36 (FIG. 2) of free running counter 12. Bit 2 of ICPRE has the label DCLAT and is the down counter enable bit 106 (FIG. 3). Bit 3 of ICPRE has the label ICLAT and is the zero signal force bit 108 (FIG. 3). Bits 4 and 5 of ICPRE have the mnemonic labels DCPR0 and DCPR1, respectively, and are the select bits 64 for prescaler 62 (FIG. 3) of interval timer 18. Bit 6 of ICPRE has the mnemonic label RDDCL and is the read mode bit 92 (FIG. 3) of interval timer 18.

Bit 7 of ICPRE has the mnemonic label MODDC and is the interval mode bit 72 (FIG. 3) of interval timer 18.

As can be seen from an examination of FIG. 10, the register described above with respect to FIGS. 7 and 8 is used to implement the ICTCR1-4 registers which hold the edge selection control bits and the read mode control bits for channels 1-4, respectively. Conventional registers are used to implement the other registers. As is apparent, other embodiments of the present invention will have different requirements for control register functionality and will, therefore require selections of which control register bits to implement using the register of FIGS. 7 and 8.

As will be understood by one skilled in the art, the assignment of particular control bits to particular registers is subject to wide variations in design choice. The bit map of FIG. 10 is provided for purposes of clarity only.

Figure 11:
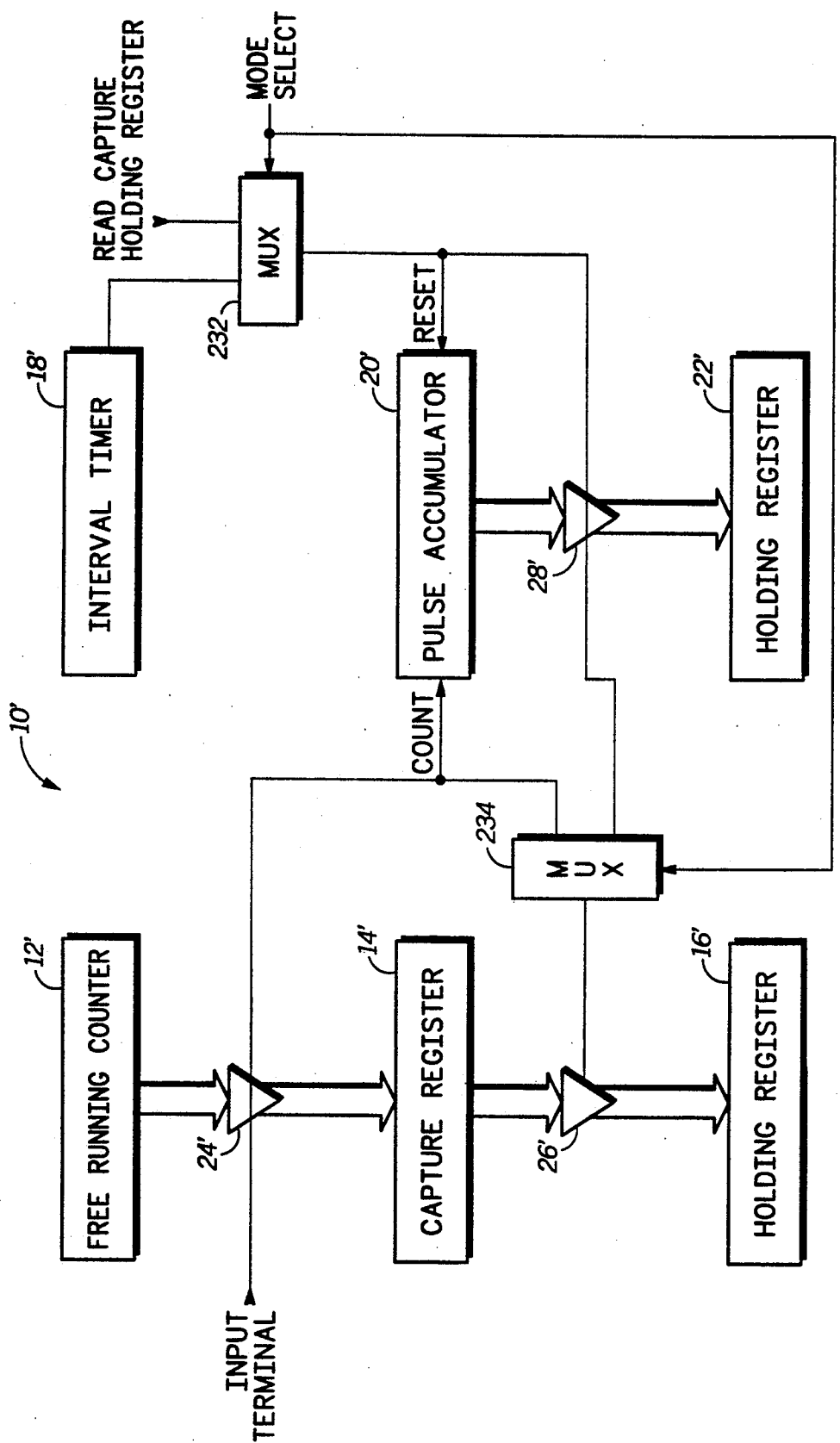
FIG. 11 illustrates, in block diagram form, a modified digital timer.

FIG. 11 illustrates, in block diagram form, a preferred embodiment of the present invention. Elements of the apparatus of FIG. 11 which are identical to elements of the apparatus of FIG. 1 are denominated with "primed" reference numerals. Only those elements of the apparatus of FIG. 11 which are new or modified with respect to the apparatus of FIG. 1 will be discussed in detail.

A first multiplexer 232 has an input connected to receive the zero output signal from interval timer 18' and an input connected to receive a control signal (Read Capture Holding Register) which also causes the contents of holding register 16' to be read. A control input of multiplexer 232 is connected to receive a Mode Select control signal. An output of multiplexer 232 is connected to the reset input of pulse accumulator 20', to the control input of selective coupling logic 28' and to one input of a second multiplexer 234. A second input of second multiplexer 234 is connected to receive the input signal from the edge selection logic (FIG. 4). While shown as one signal, it is apparent from the description of FIG. 4 that this is actually two signals: one which causes a capture and one which causes the pulse accumulator to increment. Depending on the states of the edge selection bits, these two signals may or may not be simultaneously active. In this case, it is the signal which causes selective coupling logic 24' to perform the capture operation that is connected to multiplexer 234. The control input of multiplexer 234 is connected to receive the Mode Select signal. The output of multiplexer 234 is connected to the control input of selective coupling logic 26'.

The Mode Select control signal is simply the state of a control bit in a register. The CPU can change the state of this control bit and thus change the Mode Select signal. When the Mode Select signal is in a first state, the apparatus of FIG. 11 operates in exactly the same manner as the apparatus of FIG. 1. That is, multiplexer 232 connects the output of interval timer 18' to the reset input of pulse accumulator 20' and to selective coupling logic 28' and multiplexer 234 further connects the output of interval timer 18' to selective coupling logic 26'. When the Mode Select signal is in the other state, multiplexer 232 connects the Read FIFO signal to the reset input of pulse accumulator 20' and to the control input of selective coupling logic 28'. In addition, multiplexer 234 connects the signal from the input terminal to selective coupling logic 26'.

In this second mode of operation provided by the apparatus of FIG. 11, the contents of capture register 14' is loaded into holding register 16' each time a capture event (the pre-defined active capture edge) occurs. It should be noted that the design of the circuits used to implement the apparatus of FIG. 11 must assure that holding register 16' has settled to its new value (the old capture value) and that selective coupling logic 26' has been disabled before selective coupling logic 24' is activated in order to be certain that the value loaded into holding register 16' represents the old capture value and not the new capture value. In addition, each time a capture value is read from holding register 16' in the second mode of operation, pulse accumulator 20' is first read into holding register 22' and is then reset to zero.

The apparatus of FIG. 11 preserves all of the functionality of the apparatus of FIG. 1 while providing improved ability to perform certain timing algorithms. For instance, U.S. Pat. No. 4,799,178 discloses an algorithm for measuring the rotational speed of a rotating member. In one mode of operation described in the '178 patent, it is required that capture events occur on adjacent edges (i.e., a falling edge and the immediately subsequent rising edge) of an input signal. The apparatus of FIG. 1 can perform this function, but would require that an interrupt request be generated and responded to in order to store the first capture value to memory before the subsequent edge occurs. In some applications, the requirement of generating an interrupt request on each capture event may not be acceptable. The apparatus of FIG. 11 permits a single interrupt service routine to first read capture register 14' and then read capture holding register 16', which also causes the contents of pulse accumulator 20' to be transferred to holding register 22' and then be reset to zero. In addition, the fact that the apparatus of FIG. 11 first saves and then resets the pulse accumulator when the capture holding register 16' is read permits a subsequent examination of the contents of the pulse accumulator to determine whether a new event has been counted since the holding register 16' was last read.

While the present invention has been shown and described with reference to two particular embodiments thereof, various modifications and changes to those embodiments will be apparent to those skilled in the art and are within the scope of the appended claims.

What is claimed is:

1. A data processing system comprising:
    central processing unit means for executing instructions;
    register means under control of the central processing unit means for storing a data value and for providing an output signal;
    wait control logic, the wait control logic further comprising:
    latch means under control of the central processing unit for storing a data value and for providing an output signal; and
    logic means coupled to receive the output signal from the latch means, coupled to receive a write control signal from the central processing unit means and coupled to receive an event signal for providing a transfer control signal to the register means upon receipt of the write control signal if the output signal from the latch means is in a first state and upon receipt of the event signal if the output signal from the latch means is in a second state.

2. The data processing system according to claim 1 wherein the wait control means further comprises:
    status means responsive to a request received from the central processing unit means for providing a signal indicative of whether the output signal provided by the register means presently represents the particular data value.

3. The data processing system according to claim 1 wherein the latch means and the register means may be accessed simultaneously by the central processing unit.

4. The data processing system according to claim 1 wherein the register means further comprises:
first storage means for storing a data value in response to receipt of the write control signal from the central processing unit; and
second storage means for storing a data value received from the first storage means in response to receipt of the transfer control signal from the logic means and for providing the output signal of the register means.

5. The data processing system according to claim 4 wherein the logic means further comprises:
reset means for resetting the latch means in response to receipt of the event signal.

6. The data processing system according to claim 4 further comprising:
read means under control of the central processing unit means for providing to the central processing unit means a representation of the data value stored in the second storage means.

7. The data processing system according to claim 4 further comprising:
read means under control of the central processing unit means for providing to the central processing unit means a representation of the data value stored in the first storage means.

8. A data processing system comprising:
a central processing unit;
a data bus coupled to the central processing unit;
mode logic means for receiving a write control signal from the central processing unit, a data value from the central processing unit via the data bus and an event signal and for generating a transfer control signal in response to receipt of the write control signal if the data value is equal to a first predetermined value and in response to receipt of the event signal if the data value is equal to a second predetermined value;
a latch, the latch further comprising:
first storage means first storing a data value;
first select means for coupling the first storage means to the data bus in response to receipt of the write control signal from the central processing unit;
second storage means for storing a data value;
transfer means for receiving the transfer control signal and for transferring, in response to receipt of the transfer control signal, a data value stored in the first storage means to the second storage means; and
an output coupled to the second storage means.

9. The data processing system according to claim 8 wherein the mode logic further comprises:
a second latch coupled to receive the data value from the data bus and having an output; and
transfer signal generation logic having a first input coupled to receive the write control signal, a second input coupled to receive the event signal and a third input coupled to the output of the second latch and having an output coupled to the transfer means.

10. The data processing system according to claim 9 further comprising:
reset means for resetting the second latch in response to receipt of the event signal; and
read means for receiving a read control signal from the central processing unit and for providing, in response to the read control signal, a signal corresponding to the data value stored by the second latch to the data bus.

11. The data processing system according to claim 8 wherein said latch further comprises:
second select means for coupling the second storage means to the data bus in response to receipt of a read control signal from the central processing unit.

12. The data processing system according to claim 8 wherein said latch further comprises:
second select means for coupling the first storage means to the data bus in response to receipt of a read control signal from the central processing unit.

13. A register comprising:
first input means for receiving a write control signal;
second input means for receiving an event signal;
third input means for receiving a plurality of data signals;
first latch means coupled to the third input means to receive a first one of the plurality of data signals and to the first input means to receive the write control signal for storing a data value corresponding to the first one of the plurality of data signals in response to receipt of the write control signal and for providing at an output an output signal corresponding the stored data value;
mode logic means coupled to the first input means to receive the write control signal, to the output of the first latch means to receive the output signal and to the second input means to receive the event signal for providing at an output a transfer control signal in response to receipt of the write control signal if the output signal of the first latch means is in a first state and in response to receipt of the event signal if the output signal of the first latch means is in a second state; and
second latch means further comprising:
first storage means coupled to the first input means to receive the write control signal and to the third input means to receive a second one of the plurality of data signals for storing a data value corresponding to the second one of the plurality of data signals in response to receipt of the write control signal;
transfer means coupled to the mode logic means to receive the transfer control signal for transferring a data signal corresponding to the data value stored in the first storage means to an output of the transfer means in response to receipt of the transfer control signal; and
second storage means coupled to the output of the transfer means for storing a data value corresponding to data signal transferred by the transfer means.

14. The register according to claim 13 further comprising
reset means coupled to the second input means to receive the event signal for forcing the output signal of the first latch means to be in the first state in response to receipt of the event signal; and read means for receiving a read control signal and for providing, in response to receipt of the read control signal, a signal corresponding to the data value stored by the first latch means.

15. The register according to claim 13 further comprising:
fourth input means for receiving a read control signal; and
means for coupling the second storage means to the data bus in response to receipt of the read control signal.

16. The register according to claim 13 further comprising:
fourth input means for receiving a read control signal; and
means for coupling the first storage means to the data bus in response to receipt of the read control signal.

* * * * *